United States Patent [19]
Stein

[11] 3,722,212
[45] Mar. 27, 1973

[54] GAS TURBINE ENGINE LUBRICATION SYSTEM

[75] Inventor: Wolfgang J. Stein, Milford, Conn.

[73] Assignee: Avco Corporation, Stratford, Conn.

[22] Filed: Mar. 4, 1971

[21] Appl. No.: 120,853

[52] U.S. Cl. .............................. 60/39.08, 184/6.11
[51] Int. Cl. ........................................... F02c 7/06
[58] Field of Search ................. 60/39.08; 184/6.11

[56] References Cited

UNITED STATES PATENTS

| | | | |
|---|---|---|---|
| 2,907,527 | 10/1959 | Cummings | 60/39.08 |
| 3,016,701 | 1/1962 | Kolfenbach et al. | 60/39.08 |
| 2,693,248 | 11/1954 | Gaubatz et al. | 60/39.08 |
| 2,672,278 | 3/1954 | Newcomb | 60/39.08 |

FOREIGN PATENTS OR APPLICATIONS

| | | | |
|---|---|---|---|
| 321,658 | 5/1957 | Switzerland | 60/39.08 |
| 328,560 | 3/1958 | Switzerland | 60/39.08 |

*Primary Examiner*—Carlton R. Croyle
*Assistant Examiner*—Warren Olsen
*Attorney*—Charles M. Hogan and Gary M. Gron

[57] ABSTRACT

The disclosure illustrates a gas turbine engine lubrication system comprising a pump that pressurizes oil and delivers it through a heat exchanger to the engine bearings located in a hot region of the engine. From there the lubricating fluid is de-aerated and repressurized without passing it through a heat exchanger for delivery to the bearing assemblies located in the cooler region of the engine. This lowers the heat rejection of the engine and minimizes the heat exchanger requirements.

8 Claims, 1 Drawing Figure

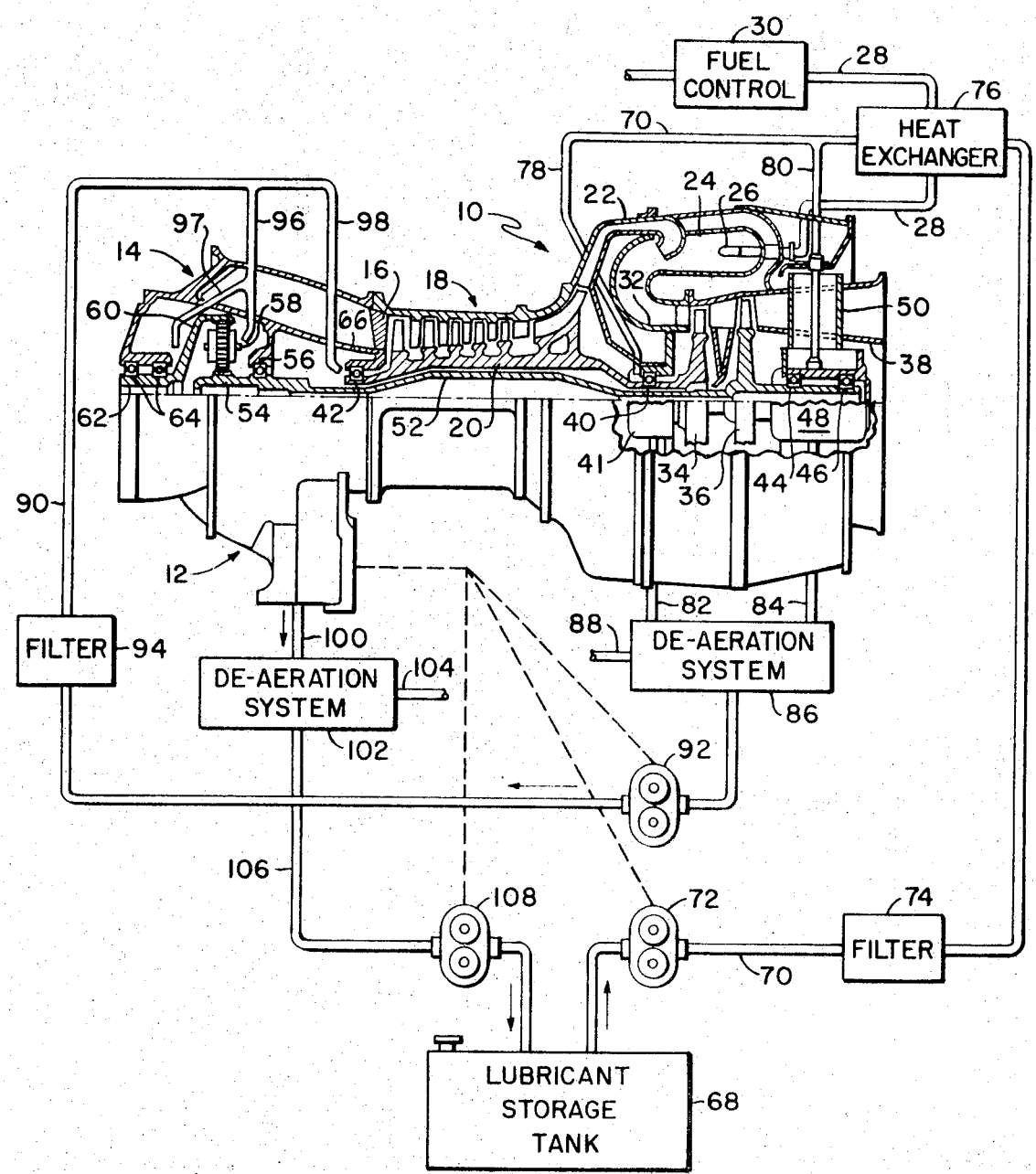

GAS TURBINE ENGINE LUBRICATION SYSTEM

The present invention relates to gas turbine engines and more particularly to lubrication systems for this type of engine.

The lubrication system for the modern gas turbine engine is designed to lubricate and cool the rotating parts of the engine under very severe conditions. As the operating temperatures of the engines have increased, the need for cooling the lubricating fluid so that it can cool the rotating parts has become more and more important. In the past this has been accomplished by using a heat exchanger which cools the lubricating fluid by utilizing the fuel consumed by the engine as the cooling medium. This has been quite effective in cooling the lubricating fluid because the fuel amounted to a substantial heat sink that was consumed by the engine after it has served its purpose as a heat exchange medium.

However, in recent years the efficiency of gas turbine engines has significantly increased, thereby minimizing the amount of fuel available as a heat exchange medium. One way to accomplish the additional heat exchange requirement is by the use of an air-oil heat exchanger. This approach, however, greatly increases the cost and weight of the engine.

Therefore it is an object of the present invention to provide a lubrication system in a gas turbine engine which maintains the fluid within reasonable operating temperatures while minimizing heat exchanger requirements.

In one aspect of the present invention the above ends are achieved by a lubricating system for a gas turbine engine where the lubricating fluid that is cooled and pressurized for delivery to a bearing assembly located in a hot region of the engine is repressurized and delivered to a bearing assembly located in a cool region of the engine. Thus, the heat rejected by the engine to the oil is minimized.

The above and other related objects and features of the present invention will be apparent from a reading of the description of the disclosure shown in the accompanying drawing and the novelty thereof pointed out in the appended claims.

The single FIGURE illustrates a gas turbine engine incorporating a lubrication system which embodies the present invention.

Referring to the drawing there is shown an engine 10 comprising an outer housing 12 that forms the outer bounds for an inlet 14 for entry of air past a series of hollow radial struts 16 to a compressor 18, including a bladed rotor 20. Rotor 20 is journaled at its forward end by a bearing assembly 42 supported by an inner casing, or sump chamber 66, connected to struts 16.

The air from the compressor 18 is pressurized and delivered through a diffuser 22 to a combustor 24 where fuel is injected via nozzles 26 to provide a combustible mixture. Fuel to the nozzles 26 is supplied by conduit 28 extending from a fuel control 30. Fuel control 30 delivers a metered amount of fuel to the nozzles 26 in accordance with operator demand modified by selected engine operating parameters, as is well known to those skilled in the art.

The resultant fuel-air mixture in the combustor 24 is ignited by suitable means and passed through a turbine engine discharge duct 32 across a gas producer bladed turbine rotor 34. Bladed rotor 34 is connected to compressor rotor 20 and is journaled by means of bearing assembly 40 supported within a sump chamber 41. The gases then pass across a power turbine bladed rotor assembly 36 to an exhaust duct 38. The passage of the hot gas stream across the bladed rotors 34 and 36 causes them to rotate.

Power turbine rotor 36 is journaled by bearing assemblies 44 and 46 supported by an aft sump chamber 48. Chamber 48 is secured to the engine casing by radial struts 50. An internal shaft 52 extends from the power turbine rotor 36 to an integral sun gear 54. Shaft 52 is journaled at the forward end by a bearing assembly 56 supported by chamber 66. A series of planet gears 58, suitably journaled, mesh with the sun gear 54 and also with a ring gear 60. Ring gear 60 is integral with an output shaft 62 journaled by bearing assemblies 64.

The engine incorporates a lubrication system that comprises a lubricant storage tank 68 and a supply conduit 70 connected to an engine driven lubricating fluid pump 72 which pressurizes the fluid for delivery to a filter 74. A heat exchanger 76 is interposed in conduit 70 and receives fuel from conduit 28 so that the fuel delivered to the engine cools the lubricating fluid passing through conduit 70.

Conduits 78 and 80 respectively deliver the pressurized lubricating fluid to bearing assembly 40 and bearing assemblies 44, 46. Return conduits 82 and 84 extend from the lower part of sump chambers 41 and 48 to a de-aeration system, generally indicated by reference character 86. Briefly, this system comprises a separator where any excess air is permitted to pass overboard through a vent pipe 88 while the lubricating fluid is delivered to a conduit 90.

An engine driven pump 92 repressurizes the lubricating fluid and delivers it through a filter 94 to conduits 96, 97 and 98 which extend to the bearing assemblies located in the sump chamber 66. A return conduit 100, connected to the lower portion of chamber 66, has a de-aeration system 102 similar to de-aeration system 86 where air is vented overboard through pipe 104 and the lubricating fluid delivered to conduit 106. An engine driven scavenge pump 108 in conduit 106 positively feeds the lubricating fluid to the storage tank 68.

During normal operation of the engine 10 the bearing assemblies 40, 44 and 46 are exposed to relatively high temperatures because of their proximity to the hot gas stream passing through the combustor discharge duct 32 and across the turbine rotors 34 and 36. In contrast, the bearings 42, 56 and 64 are exposed to relatively cool temperatures because they are near the inlet of the engine where the cool inlet air is passing across and around chamber 66. The lubricant fluid is pressurized by pump 72 and cooled by heat exchanger 76 for delivery to the bearings located in the hot region of the engine. The lubricating fluid thus cools the bearings 40, 44 and 46 and at the same time its temperature is substantially increased.

From there the lubricating fluid is passed to the de-aeration system and repressurized at its highly elevated temperatures for delivery to the forward bearings. The conduits 96, 97 and 98 pass through at least one of the forward radial struts 16 and the lubricating fluid is cooled to a small degree. The oil at the elevated temperature lubricates the forward bearinG assemblies and the temperatures of the lubricating fluid are high enough so that there is substantially no heat rejection to the lubricating fluid from the bearings. The lubricating fluid is then supplied to the de-aeration system 102 and pumped by the pump 108 to the lubricant storage tank for repressurization.

Examples of typical temperatures that may be encountered in a system of this type are:

| | |
|---|---|
| Lubricant storage tank 68 | 350°F. |
| Discharge from heat exchanger 76 | 200°–225°F. |
| Discharge from sumps 41, 48 | ≈ 400°F. |
| After passing through front struts 16 | 350°F. |
| Discharge from sump 66 | 350°F. |

It can be seen that because the hot lubricating fluid from the aft bearing assemblies is fed directly to the relatively cool forward bearing assemblies with very little cooling that the rejection of heat by the engine is greatly reduced while at the same time the requirements of the heat exchanger are substantially lessened. It is pointed out that in prior systems the lubricating fluid going to all the bearings was passed through the heat exchanger 76 so that the lubricating fluid passing through the forward bearings at a temperature so low that heat was rejected from the forward bearing assemblies to the lubricating fluid. The present lubricating system maintains both the forward and aft bearing temperatures at uniformly high operating conditions so that the heat exchange requirements are substantially lessened and the amount of waste heat rejected by the engine is minimized.

While the preferred embodiment of the present invention has been described, it will be apparent to those skilled in the art that other modifications may be performed without departing from the spirit and scope of the present invention.

Having thus described the invention, what is claimed as novel and desired to be secured by Letters Patent of the United States is:

1. In a gas turbine engine comprising a compressor for pressurizing relatively cool inlet air, a combustor wherein a hot gas stream is generated and a turbine which rotates in response to passage of the has gas stream thereacross, said engine having an outer casing having a rotor journaled therein for rotation by at least two bearing assemblies, the first of which is in the cool region adjacent the compressor inlet and the second of which is located adjacent the hot gas region, a lubrication system comprising:

means for supplying a source of cooled pressurized lubricating fluid to the bearing assembly adjacent said hot gas region;

means for receiving the lubricant from said second bearing assembly and repressurizing it for delivery to the first bearing assembly located in said cool region;

whereby the heat rejected by said engine is minimized.

2. Apparatus as in claim 1 further comprising means receiving the lubricant from said second bearing assembly for de-aeration and delivery to said repressurizing means.

3. Apparatus as in claim 2 wherein said first bearing assembly is supported by a plurality of radial struts extending across the inlet air path of said engine to said casing and wherein said lubrication system further comprises conduit means extending from said repressurizing means through at least one of said struts whereby the lubricant is cooled by the inlet air.

4. Apparatus as in claim 1 wherein:

said second bearing assembly pressurizing means comprises a first conduit extending from a lubricant supply to the second bearing assembly and a pump interposed in said first conduit;

said repressurizing means comprises a second conduit extending from said second bearing assembly to said first bearing assembly and a second pump interposed in said second conduit.

5. Apparatus as in claim 4 wherein said second bearing assembly pressurizing means includes a heat exchanger interposed in said first conduit.

6. Apparatus as in claim 5 wherein said lubrication system further comprises means interposed in said conduit means between the repressurizing pump and said second bearing assembly for de-aerating the oil from said second bearing assembly.

7. Apparatus as in claim 6 wherein said lubrication system further comprises:

a lubricant storage tank;

a return conduit extending from said first bearing assembly to said storage tank;

a scavenge pump interposed in said return conduit for positively feeding lubricant to said storage tank; and means interposed in said return conduit between said scavenge pump and said first bearing assembly for de-aerating the lubricating fluid.

8. Apparatus as in claim 7 wherein said first bearing assembly is supported by a plurality of radial struts extending across the air inlet path of said engine to said casing and said engine has a fuel control system supplying a source of fuel to said combustor and wherein:

said heat exchanger comprises an element adapted to receive the lubricant fluid and the fuel from said fuel control system whereby the lubricant is cooled;

the conduit extending from said second bearing assembly to said first bearing assembly extends through at least one of said forward struts, whereby the oil is cooled by the air entering said engine.

* * * * *